(12) United States Patent
Titchkosky et al.

(10) Patent No.: US 11,387,636 B2
(45) Date of Patent: Jul. 12, 2022

(54) SYSTEM FOR CONFIGURING AN ENVIRONMENT TO PROVIDE MOBILE COMPUTING

(71) Applicant: BVN Architecture Pty Ltd, Sydney (AU)

(72) Inventors: Ninotschka Anna Titchkosky, Double Bay (AU); Marc Edward Sirl, Glebe (AU); Ross William Seymour, Bonnet Bay (AU); Elynda Naru, Sinnamon Park (AU); Marco Montevecchi, North Bondi (AU); Abbie Renee Lewis, Potts Point (AU); Victoria Hey, Clovelly (AU); Benjamin John Doherty, Marrickville (AU); Haydn David Davies, Coogee (AU); Matthew Charles Francis Blair, Elizabeth Bay (AU); Christopher James Bickerton, Darlinghurst (AU)

(73) Assignee: BVN Architecture Pty Ltd, Sydney (AU)

( * ) Notice: Subject to any disclaimer, the term of this patent is extended or adjusted under 35 U.S.C. 154(b) by 518 days.

(21) Appl. No.: 16/525,065

(22) Filed: Jul. 29, 2019

(65) Prior Publication Data

US 2020/0044424 A1     Feb. 6, 2020

(30) Foreign Application Priority Data

Jul. 31, 2018   (AU) ................ 2018902767

(51) Int. Cl.
*H02G 3/00*  (2006.01)
*H02G 3/04*  (2006.01)
(Continued)

(52) U.S. Cl.
CPC ........ *H02G 3/0456* (2013.01); *F16M 13/027* (2013.01); *F21V 33/0052* (2013.01); *G06F 1/18* (2013.01); *F16M 2200/066* (2013.01)

(58) Field of Classification Search
CPC .............. H02G 3/0456; F16M 13/027; F16M 2200/066; F21V 33/0052; G06F 1/18
See application file for complete search history.

(56) References Cited

U.S. PATENT DOCUMENTS 7,770,860 B1    8/2010  Culpepper et al.
8,582,299 B1 *  11/2013 Phillips ................ H05K 7/1492
                                                            361/727

(Continued)

FOREIGN PATENT DOCUMENTS

| DE | 20107119 U1 | 4/2001 |
| DE | 20318044 U1 | 4/2004 |
| DE | 202014103136 U1 | 10/2014 |

OTHER PUBLICATIONS

UK Search Report for Application No. GB1910847.1 dated Jan. 17, 2020.

*Primary Examiner* — Pete T Lee
(74) *Attorney, Agent, or Firm* — Neal, Gerber & Eisenberg LLP

(57) ABSTRACT

A system for configuring an environment to provide mobile computing, the system including: one or more booms suspended from a soffit of the environment, each of the booms including a moveable arm moveable at least in part in a plane parallel to the soffit and the moveable arm having a proximal end connected to power and data cables attached to the soffit and a distal end where the power and data cables are suspended therefrom; and one or more switching hubs, each of the switching hubs are arranged to be removably mounted to a mobile station moveable within the environment, to be removably connected to the power and data (Continued)

cables suspended from the distal end of the moveable arm of one of the booms, and to be removably connected to at least one computer in the environment to distribute power and data to the at least one computer.

19 Claims, 3 Drawing Sheets

(51) Int. Cl.
*G06F 1/18* (2006.01)
*F16M 13/02* (2006.01)
*F21V 33/00* (2006.01)

(56) References Cited

U.S. PATENT DOCUMENTS

| | | | |
|---|---|---|---|
| 2007/0158522 A1* | 7/2007 | Shahrokhi | F16M 11/08 248/429 |
| 2008/0017760 A1* | 1/2008 | Larsen | H02G 3/0443 248/49 |
| 2011/0108689 A1* | 5/2011 | Dorris | F16M 11/041 248/220.21 |
| 2014/0196928 A1 | 7/2014 | Yang | |
| 2017/0016572 A1 | 1/2017 | Notheis et al. | |

* cited by examiner

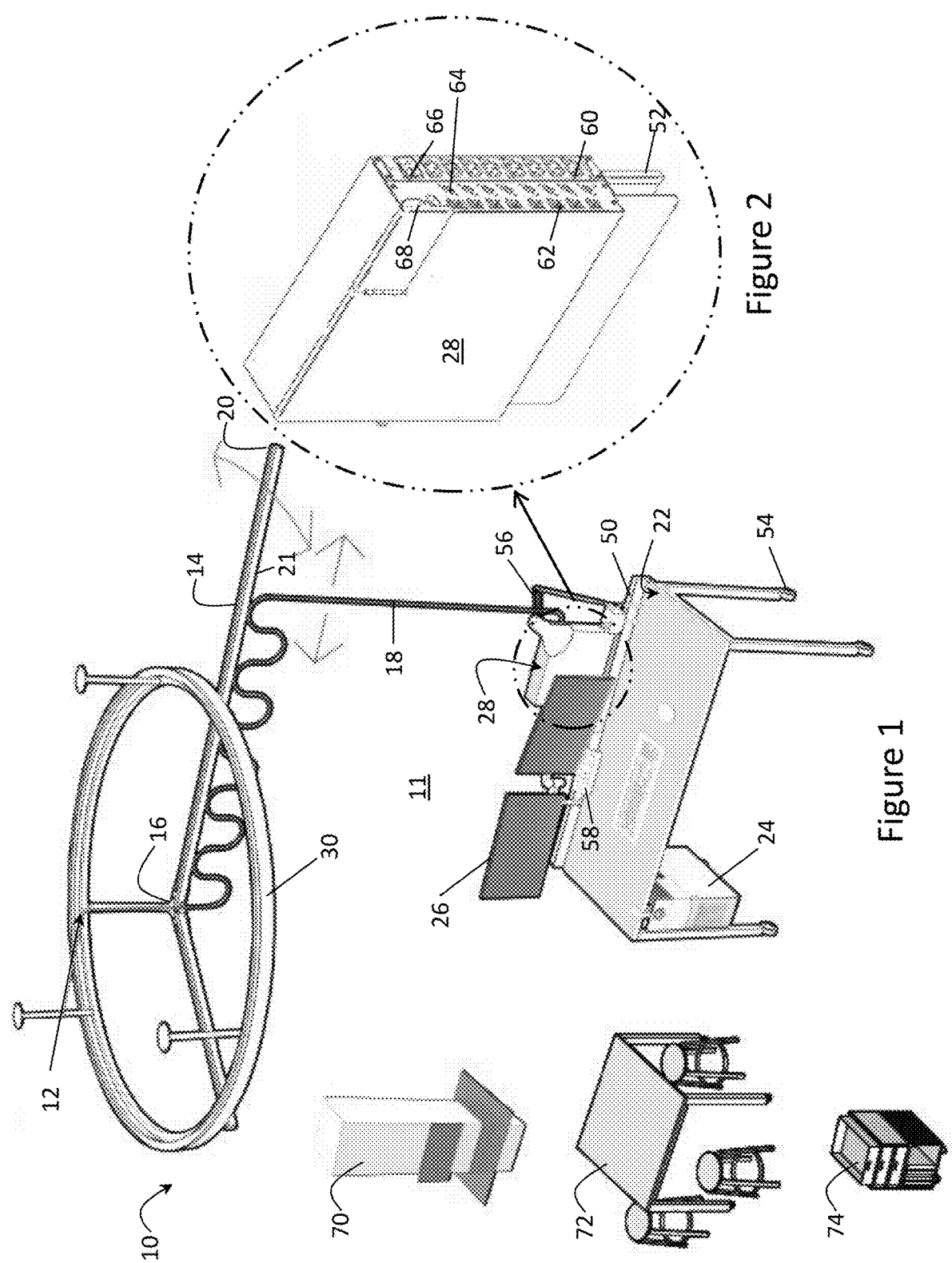

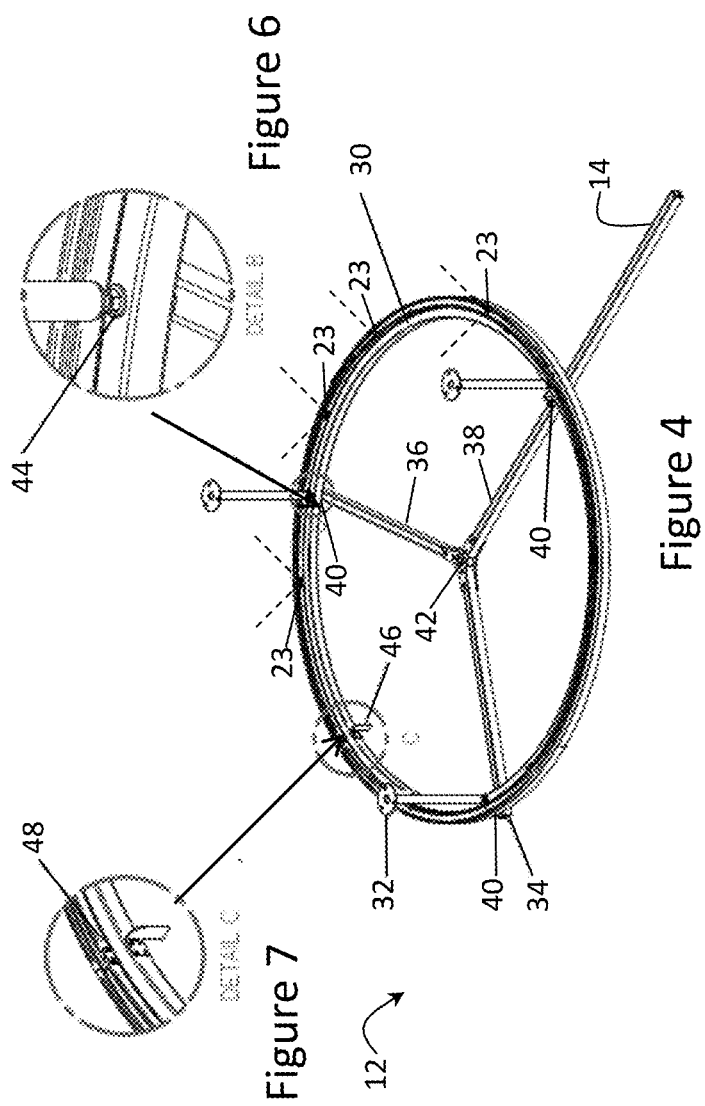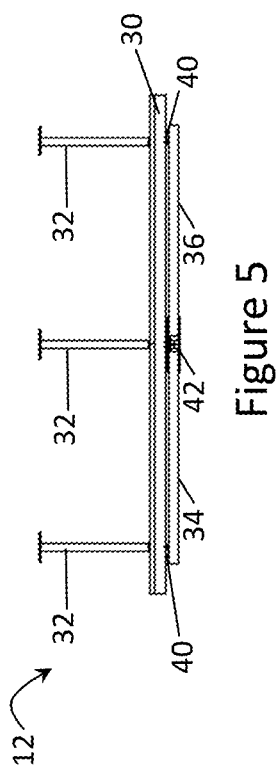

SYSTEM FOR CONFIGURING AN ENVIRONMENT TO PROVIDE MOBILE COMPUTING

PRIORITY CLAIM

This application claims the benefit of and priority to Australian Patent Application No. 2018902767, filed on Jul. 31, 2018, the entire contents of which are incorporated by reference herein.

TECHNICAL FIELD

The present disclosure relates to a system and method of configuring an environment to provide mobile computing, the system including one or more booms suspended from a soffit of the environment, and one or more switching hubs arranged to be mounted on mobile stations moveable within the environment. In particular, but not exclusively, each of the booms include a moveable arm having a proximal end connected to power and fibre optic data cables attached to the soffit and a distal end where the power and data cables are suspended therefrom. Further, but not exclusively, the power and data cables are removably connected to a switching hub mounted to one of the mobile stations which in turn is connected to up to, for example, eight computers mounted to adjacent mobile stations to distribute power and data to the eight computers.

BACKGROUND

Environments, such as workspace environments, have typically evolved over the last few decades from, for example, a floor of many private, walled offices, to a floor of perimeter offices with high-paneled cubicles centrally located on the floor, to more of an open plan layout without the high-paneled cubicles and many of the perimeter offices. In an example of a typical open-play layout, workstations are organised in rows of desks on a floor and users can mount their computers to any available desk to work therefrom. If, for example, the computers are laptops and the workspace has Wi-Fi data connectivity, the users may be free to sit at any of the desks. In practice, however, users typically sit at the same desks each day. Otherwise, the users may have a designated computer mounted to a desk and here the users also sit at their designated desk each day. Each of these exemplary workspaces, however, has fixed infrastructure, such as desks, power points, data points, etc., for the computers, and thus these workspaces are not readily reconfigurable.

It should be appreciated that the above background discussion is included to explain the context of the present disclosure. It is not to be taken as an admission that any of the documents or other material referred to was published, known or part of the common general knowledge at the priority date of any one of the claims of this specification.

SUMMARY

According to one aspect of the present disclosure, there is provided a system for configuring an environment to provide mobile computing, the system including: one or more booms suspended from a soffit of the environment, each of the booms including a moveable arm moveable at least in part in a plane parallel to the soffit and the moveable arm having a proximal end connected to power and data cables attached to the soffit and a distal end where the power and data cables are suspended therefrom; and one or more switching hubs, each of the switching hubs are arranged to be removably mounted to a mobile station moveable within the environment, to be removably connected to the power and data cables suspended from the distal end of the moveable arm of one of the booms, and to be removably connected to at least one computer in the environment to distribute power and data to the at least one computer.

According to another aspect of the present disclosure, there is provided a method of configuring an environment to provide mobile computing, the method including: suspending one or more booms from a soffit of the environment, each of the booms including a moveable arm moveable at least in part in a plane parallel to the soffit and the moveable arm having a proximal end connected to power and data cables attached to the soffit and a distal end where the power and data cables are suspended therefrom; locating one or more mobile stations within the environment; mounting one of the switching hubs to one of the mobile stations; connecting the switching hub to the power and data cables suspended from the distal end of the moveable arm of one of the booms; and connecting the switching hub to at least one computer to distribute power and data to the at least one computer.

In an example, the environment is a workspace, such as a floor of a building for office workers/users. In another example, the environment is a teaching environment. It will be appreciated by those persons skilled in the art, however, that the system could also have application in many other types of environments, such as semi-permanent or temporary environments including co-working environments or schools/universities, where maximum flexibility is desirable as the way these environments are set-up and users' needs cannot be fully predicted. The system thus provides a relatively flexible furniture solution in the environment by having user controlled power and data to the computers in the environment.

For example, the environment is a floor in a workspace with ten booms suspended from a soffit of the workspace environment. In this example, the workspace environment is readily configurable by locating the mobile stations (e.g., workstations or desks) in the desired locations about the ten booms and then mounting and connecting the switching hubs and the computers via cables or wirelessly. In certain embodiments, the data cables are fibre optic cables providing relatively fast data speeds for the users. The infrastructure of the workspace environment is therefore configurable, rather than just different users moving desks in the above example of an open-plan workspace. The effectiveness of the workspace environment and, indeed, the users of the workspace environment are thus enhanced by providing this configurability. The system delivers power and data to users' computers whilst enabling them to self-organize without constraint in the environment, especially when they are relatively high data users and Wi-Fi is insufficient for data delivery. They do not need to engage with facilities' managers or electricians to set up, to move or to route the power and data cables. Therefore, the system enables organizations to be relatively agile, nimble and to provide agency to their people.

In certain embodiments, one of the switching hubs is removably mounted to one of the mobile stations and removably connected to the at least one computer mounted to one of the mobile stations and removably connected to at least one further computer mounted to an adjacent one of the mobile stations. As mentioned, the switching hub may be removable connected to the computers wirelessly or via suitable data cables.

For example, one of the switching hubs is removably connected to up to eight computers mounted to eight adjacent mobile stations. That is, a user connects the switching hub to the power and data cables suspended from the distal end of the moveable arm, which may be incorporated into 'arterial' soft wiring, and connects the switching hub to the computers. In this example, on one day, teams of eight users can work closely together by arranging their mobile stations adjacent each other and underneath the boom. On another day, the users may wish to work individually and move their stations accordingly provided they are connectable to a switching hub. This configurability meets the changing needs of the business occupying the floor and eliminates the need for relatively expensive and relatively time consuming reconfiguring of infrastructure in the environment and enables organizations to be relatively agile and adjust relatively quickly.

In certain embodiments, the moveable arm includes a rail extending along a length of the moveable arm arranged to support the power and data cables so that a suspension point of the power and data cables from the moveable arm is moveable along the length of moveable arm. That is, the power and data cables suspended from the boom can be moved by moving the arm parallel to the soffit and by moving the cables along the length of moveable arm.

In various embodiments, the boom includes a ring suspended from the soffit and the moveable arm is suspended from the ring and moveable relative to the ring. In certain embodiments, the moveable arm is a tri-part cantilevered arm connected to the ring at three suspension fixtures and wherein the proximal end of the tri-part cantilevered arm is located in the middle of the ring and connected to power and data cables attached to the soffit. Thus, the power and data cables suspended from the boom can be moved by moving the cantilevered arm in a 355 degree arc parallel to the soffit and by moving the cables along the length of cantilevered arm. In certain embodiments, the distal end of the tri-part cantilevered arm also protrudes beyond the circumference of the ring to extend the coverage of the power and data cables within the floor area of the environment.

In certain embodiments, the ring includes a plurality of light sources (e.g., LEDs) configured to illuminate the workspace environment connected to power cables attached to the soffit. The light sources directly may illuminate the soffit of the workspace environment by providing up-lighting or may face downwards.

In certain embodiments, each of the mobile stations have a U-shaped channel and each of the switching hubs have a corresponding inverted U-shaped bracket so that the switching hubs can be removably mounted to the mobile stations along its length. The U-shaped channel enables users to run cables through the channel as well as to mount the switching hubs.

In certain embodiments, each of the switching hubs have a plurality of power output sockets, a plurality of data output sockets, one or more data input sockets (e.g., USB), and one power input socket. The power cable suspended from the moveable arm is connected to the switching hub via the power input socket and the data cable(s) suspended from the moveable arm is connected to the switching hub via the one or more data input sockets. For example, the data cables are fibre optic cables and the data input sockets are optical fibre connectors.

In an embodiment, each of the switching hubs has a transformer and a plurality of USB sockets providing low voltage power output.

Additional features are described in, and will be apparent from the following Detailed Description and the figures.

BRIEF DESCRIPTION OF DRAWINGS

Embodiments of the disclosure will now be described with reference to the accompanying drawings. It is to be understood that the embodiments are given by way of illustration only and the disclosure is not limited by this illustration. In the drawings:

FIG. 1 shows a system for configuring an environment to provide mobile computing, according to an embodiment of the present disclosure;

FIG. 2 shows a switching hub of the embodiment of FIG. 1;

FIG. 4 shows a boom of the embodiment of FIG. 1;

FIG. 5 shows another view of the boom of FIG. 4;

FIG. 6 shows a zoomed portion of the boom of FIG. 4; and

FIG. 7 shows another zoomed portion of the boom of FIG. 4.

DETAILED DESCRIPTION

Figure 3:
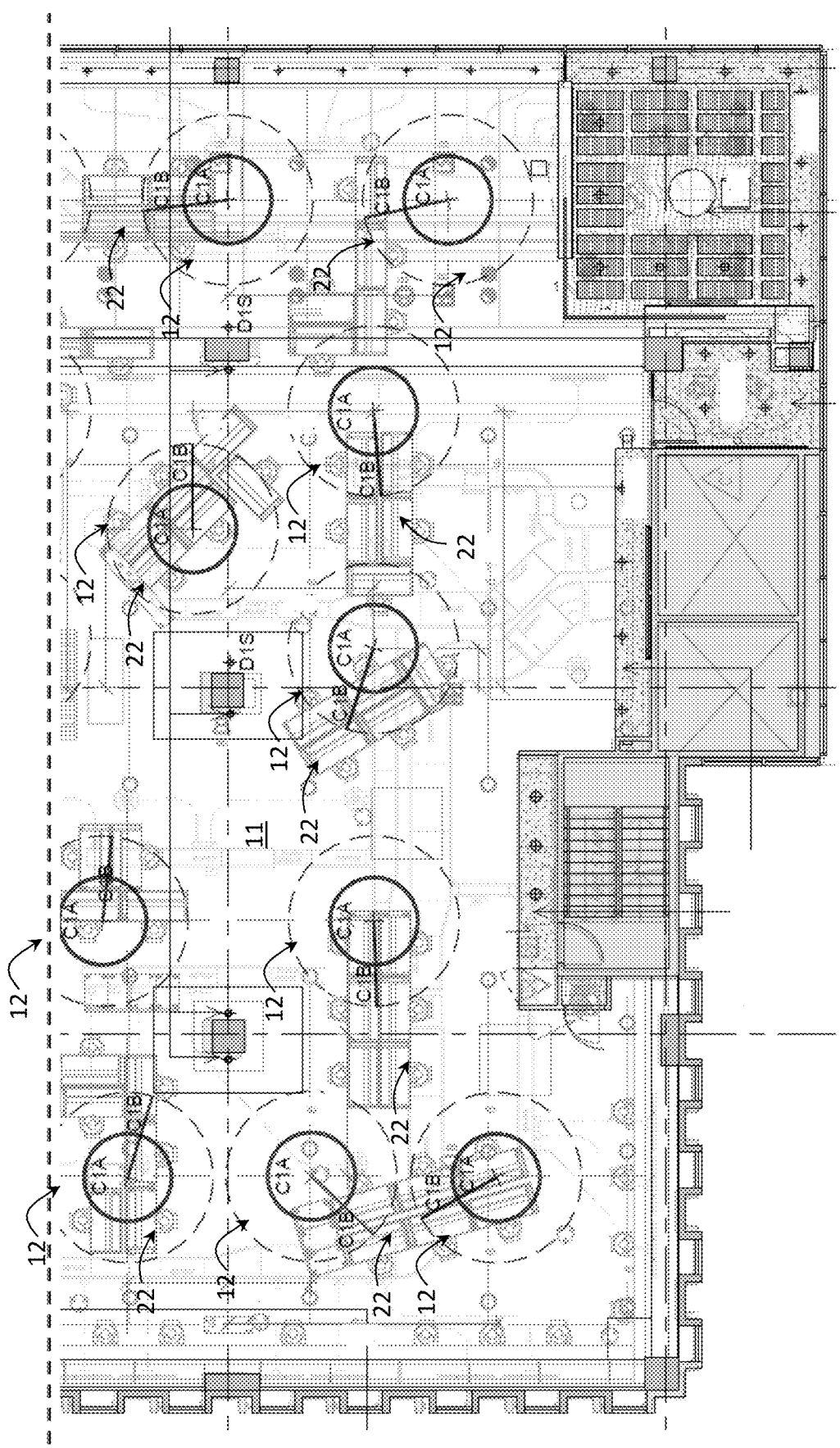
FIG. 3 shows a system installed in a workspace environment according to an embodiment of the present disclosure.

Referring now to the example embodiments of the present disclosure illustrated in FIGS. 1 to 7, an embodiment of a system 10 for configuring an environment, in the form of a workspace environment, to provide mobile computing is shown in FIG. 1 with the minimum number of components to configure a workspace environment 11. An embodiment of a workspace environment 11 configured in practice is shown in FIG. 3. Specifically, FIG. 3 shows part of a floor of a workspace environment 11, in use, configured using the mobile workstation system 10. The mobile workstation system 10 of FIG. 3 includes ten booms 12 suspended from a soffit (not shown) of the workspace environment 11. These booms 12 are shown in more detail in FIGS. 1, 4 and 5.

Each of the booms 12 include a moveable arm 14 moveable in a plane parallel to the soffit. It can be seen in FIG. 1 that the moveable arm 14 is moveable in a plane forming a 355 degree arc parallel to the soffit. The moveable arm 14 also has a proximal end 16 connected to power and data cables 18 attached to the soffit and a distal end 20 where the power and data cables 18 are suspended therefrom.

The workspace environment 11 shown in FIG. 3 includes many mobile stations 22 moveable and located in desired positions within the workplace environment 11. Each of the mobile stations 22 have a computer 24 and two display devices mounted thereto, as shown in more detail in FIG. 1. The mobile stations 22 can be located anywhere in the workspace environment 11 provided that they near one of the booms 12 so that the computer 24 has access to the power and data cables 18 suspended from the moveable arm 14; thus providing configurability of the workspace environment 11 for the users.

To provide power and data connectivity for the computers 24, the system 10 includes switching hubs 28. A switching hub 28 is shown in more detail in FIG. 2 and is arranged to be removably mounted to one of the mobile stations 22, as shown in FIG. 1. The switching hub 28 is also arranged to be removably connected to the power and data cables 18 suspended from the distal end 20 of the moveable arm 18, and to be removably connected to the computer 24 mounted to the mobile station 22 to distribute power and data to the computer 24 via data cables (not shown). In use, the stations 22 and switching hubs 28 are located in their desired location in the workspace environment 11, as shown in FIG. 2. When not in use, for example, the mobile stations 22 and switching hubs 28 can be put away and located in storage so that the workspace environment 11 can readily by configured into a different configuration. Further, the mobile stations 22 have wheels 54 so that a user can more easily locate the mobile stations 22 in the desired location in the workspace environment 11.

The moveable arm 14 is moveable in around a 355 degree arc parallel to the soffit so that the distal end 20 where the power and data cables 18 are suspended therefrom is moveable about the arc shown by the arrows in FIG. 1. The suspension point where the power and data cables 18 are suspended from the moveable arm 14 is also moveable via a rail 21 extending along a length of the moveable arm 20. The rail 21 is arranged to support the power and data cables 18 so that the suspension point of the power and data cables 18 from the moveable arm 14 can be moved in the direction of the arrows shown in FIG. 1 along the length of moveable arm 14 to be in a position corresponding to a desired location of a station 22.

The boom 12 is in the form of a ring 30 suspended from the soffit by three poles 32 and the moveable arm 14 is a tri-part cantilevered arm 14 connected to the ring at three suspension fixtures 40, shown in more detail in FIGS. 4 and 5, so that the tri-part cantilevered arm 14 is moveable relative to the ring 30 about the 355 degree arc. To achieve this, the tri-part cantilevered arm 14 has a first member 34, second member 36 and a third member 38 which are joined in the middle by fixture 42. That is, the proximal end of the tri-part cantilevered arm 14 is located in the middle of the ring 30 and is connected to power and data cables 18 attached to the soffit. The distal end of the tri-part cantilevered arm 14 protrudes beyond the circumference of the ring 30 and has the power and data cables 18 therefrom. The radius of the ring 30 is indicated as CIA in the workspace environment 11 of FIG. 3 and the radius of the protruding distal end of the tri-part cantilevered arm 14 is indicated as radius C1B in the workspace environment 11.

FIG. 4 also shows the ring 30 having a plurality of light sources 23 (e.g., LEDs), configured to illuminate the workspace environment 11 that are also connected to power cables attached to the soffit (not shown). It will be appreciated by those persons skilled in the art that other components configured to supply power to the light sources 23, such as voltage transformers, may be hidden from view to the users in the workspace environment 11 on the non-visible side of the soffit. These light sources 23 are arranged to directly illuminate the soffit of the workspace environment 11 by being pointed in an up-direction relative to the ring 30.

In the embodiment, the boom 12 is fabricated on-site in the workplace environment 11. As such, the poles 32 are attached to the ring 30 via bolts 44, shown in FIG. 6, and the ring 30 is made of three arcuate portions joined together at joins 48. In addition, the ring 30 has a projection 46 projecting downwards from the ring 30 preventing the tri-part cantilevered arm 14 from being rotated continuously in a single direction clockwise or anti-clockwise, which may interfere with the connection to the data and power cables 18 at the proximal end of the tri-part cantilevered arm 14.

The mobile stations 22 have a U-shaped channel 50 and each of the switching hubs 28 have a corresponding inverted U-shaped bracket 52 so that the switching hubs 28 can be relatively easily removably mounted to the mobile stations 22 along the length of the U-shaped channel 50 by a user configuring the workspace environment 11.

Turning back to the switching hubs, FIG. 2 shows the connectivity panel on one side of the switching hub 28. In this embodiment, there are eight power output sockets 60 and eight data output sockets 62 configured to connect, for instance, eight computers 24 to the switching hub 28. In addition, the switching hub 28 has a power input socket 66 configured to receive a power cable 18 and a data input socket 68 configured to receive a data cable 18. As mentioned, the data cable 18 may be fibre optic cables and here the data input socket 68 is an optical connector. In addition, the switching hub 28 has a transformer (not shown) and a plurality of USB sockets 64 configured to provide low voltage power output to various other low-voltage devices that a user in the workspace environment 11 may wish to connect.

Further, the user may wish to configure the workspace environment 11 with further office furniture, such as a desk lamp 56, connected to the power cable 18, powerboard 58 configured to connect further devices. Also, other office furniture may be placed in the workspace environment 11 in desired locations, such as columns 70 to provide shelves for folders, books, etc. team tables and stools 72 for, say, team meetings, and a team caddy 74 for keeping tidy items for the users. These items of furniture may also be on wheels to be more easily located within the workspace environment 11.

Those skilled in the art will also appreciate that the disclosure described herein is susceptible to variations and modifications other than those specifically described. It is to be understood that the disclosure includes all such variations and modifications. As such, it is clear that modifications and variations may be made to the disclosure described herein without departing from the scope of the appended claims and without diminishing its intended technical scope. That is, various changes and modifications to the present embodiments described herein will be apparent to those skilled in the art and it is therefore intended that such changes and modifications be covered by the appended claims.

The invention is claimed as follows:

1. A mobile computing environment configuration system comprising:
   a boom suspendable from a soffit of an environment, the boom including a moveable arm having:
      a proximal end connectable to at least one of a power cable attached to the soffit and a data cable attached to the soffit, and
      a distal end where at least one of the power cable and the data cable is suspendable therefrom; and
   a switching hub configured to be:
      removably mountable to a mobile station moveable within the environment,
      removably connectable to at least one of the power cable and the data cable suspended from the distal end of the arm of the boom, and
      removably connectable to a computer in the environment to distribute at least one of power and data to the computer.

2. The mobile computing environment configuration system of claim 1, wherein the computer is mountable to the mobile station and the switching hub is removably connectable to another computer mountable to an adjacent mobile station.

3. The mobile computing environment configuration system of claim 2, wherein the switching hub is removably connectable to up to eight computers mountable to eight adjacent mobile stations.

4. The mobile computing environment configuration system of claim 1, wherein the arm includes a rail extending along a length of the arm configured to support at least one of the power cable and the data cable such that a suspension point of at least one of the power cable and the data cable from the arm is moveable along the length of arm.

5. The mobile computing environment configuration system of claim 1, wherein the boom includes a ring suspendable from the soffit and the arm is suspended from the ring and moveable relative to the ring.

6. The mobile computing environment configuration system of claim 5, wherein the arm includes a tri-part cantilevered arm connected to the ring at three suspension fixtures and wherein the proximal end of the tri-part cantilevered arm is located in a middle of the ring and connectable to at least one of the power cable and the data cable attached to the soffit.

7. The mobile computing environment configuration system of claim 6, wherein the distal end of the tri-part cantilevered arm protrudes beyond a circumference of the ring.

8. The mobile computing environment configuration system of claim 5, wherein the ring includes a plurality of light sources configured to illuminate the environment connected to the power cable attached to the soffit.

9. The mobile computing environment configuration system of claim 8, wherein the light sources are configured to directly illuminate the soffit of the environment.

10. The mobile computing environment configuration system of claim 1, wherein the mobile station has a U-shaped channel and the switching hub has a corresponding inverted U-shaped bracket such that the switching hub is removably mounted to the mobile station.

11. The mobile computing environment configuration system of claim 1, wherein the switching hub has a plurality of power output sockets, a plurality of data output sockets, at least one data input socket, and one power input socket.

12. The mobile computing environment configuration system of claim 11, wherein the power cable is connectable to the switching hub via the power input socket and the data cable is connectable to the switching hub via the at least one data input socket.

13. The mobile computing environment configuration system of claim 12, wherein the data cable includes a fibre optic cable.

14. The mobile computing environment configuration system of claim 1, wherein the switching hub includes a transformer and a plurality of USB sockets configured to provide low voltage power output.

15. The mobile computing environment configuration system of claim 1, wherein the arm is moveable, at least in part, in a plane parallel to the soffit.

16. A method of configuring an environment to provide mobile computing, the method comprising:
suspending a boom from a soffit of the environment, the boom including an arm moveable, at least in part, in a plane parallel to the soffit and the arm having a proximal end connected to at least one of a power cable attached to the soffit and a data cable attached to the soffit, and a distal end where at least one of the power cable and the data cable is suspended therefrom;
locating a mobile station within the environment;
mounting a switching hub to the located mobile station;
connecting the switching hub to at least one of the power cable and the data cable suspended from the distal end of the arm of the boom; and
connecting the switching hub to a computer to distribute at least one of power and data to the computer.

17. A mobile computing environment boom comprising:
an arm moveable, at least in part, in a plane parallel to a soffit of a mobile computing environment, the arm including:
a proximal end connectable to at least one of a power cable attached to the soffit and a data cable attached to the soffit, and
a distal end where at least one of the power cable and the data cable is suspendable therefrom, and
a ring suspendable from the soffit, wherein the arm is suspended from the ring and moveable relative to the ring, the arm includes a tri-part cantilevered arm connected to the ring at three suspension fixtures, the proximal end of the tri-part cantilevered arm is located in a middle of the ring and connectable to at least one of the power cable and the data cable attached to the soffit, and the distal end of the tri-part cantilevered arm protrudes beyond a circumference of the ring.

18. The mobile computing environment configuration system of claim 17, wherein the ring includes a plurality of light sources configured to directly illuminate the soffit of the mobile computing environment.

19. A mobile computing environment boom comprising:
an arm moveable, at least in part, in a plane parallel to a soffit of a mobile computing environment, the arm including:
a proximal end connectable to at least one of a power cable attached to the soffit and a data cable attached to the soffit,
a distal end where at least one of the power cable and the data cable is suspendable therefrom, and
a rail extending along a length of the arm configured to support at least one of the power cable and the data cable such that a suspension point of at least one of the power cable and the data cable from the arm is moveable along the length of arm.

* * * * *